(12) United States Patent
Fujisawa

(10) Patent No.: US 9,111,270 B2
(45) Date of Patent: Aug. 18, 2015

(54) AUTHENTICATION SYSTEM

(76) Inventor: Kazunori Fujisawa, Tokyo (JP)

( * ) Notice: Subject to any disclaimer, the term of this patent is extended or adjusted under 35 U.S.C. 154(b) by 16 days.

(21) Appl. No.: 13/493,323

(22) Filed: Jun. 11, 2012

(65) Prior Publication Data

US 2013/0151359 A1    Jun. 13, 2013

(30) Foreign Application Priority Data

Jun. 13, 2011 (JP) .................................. 2011-130978
Mar. 30, 2012 (JP) .................................. 2012-080441

(51) Int. Cl.
| | |
|---|---|
| G06Q 20/00 | (2012.01) |
| G06F 17/00 | (2006.01) |
| G06K 7/00 | (2006.01) |
| G06F 7/04 | (2006.01) |
| G06Q 20/20 | (2012.01) |
| G06Q 20/32 | (2012.01) |
| G06Q 20/38 | (2012.01) |

(52) U.S. Cl.
CPC ............. *G06Q 20/204* (2013.01); *G06Q 20/206* (2013.01); *G06Q 20/3274* (2013.01); *G06Q 20/3276* (2013.01); *G06Q 20/385* (2013.01)

(58) Field of Classification Search
USPC ........................................................ 705/17
See application file for complete search history.

(56) References Cited

U.S. PATENT DOCUMENTS

| | | | | |
|---|---|---|---|---|
| 5,979,762 | A * | 11/1999 | Bianco ...................... | 235/462.01 |
| 8,024,576 | B2 * | 9/2011 | Gargaro et al. ............... | 713/183 |
| 8,249,967 | B2 * | 8/2012 | Park et al. ...................... | 705/35 |
| 8,272,038 | B2 * | 9/2012 | Husemann et al. ................ | 726/3 |
| 2001/0034717 | A1 * | 10/2001 | Whitworth ....................... | 705/64 |
| 2001/0051915 | A1 * | 12/2001 | Ueno et al. ....................... | 705/39 |
| 2002/0023027 | A1 * | 2/2002 | Simonds .......................... | 705/26 |
| 2002/0091569 | A1 * | 7/2002 | Kitaura et al. ................... | 705/14 |
| 2003/0177366 | A1 * | 9/2003 | de Jong ........................ | 713/184 |
| 2004/0148253 | A1 * | 7/2004 | Shin et al. ....................... | 705/39 |
| 2006/0031174 | A1 * | 2/2006 | Steinmetz ........................ | 705/67 |
| 2006/0054695 | A1 * | 3/2006 | Owada .......................... | 235/440 |
| 2006/0097041 | A1 * | 5/2006 | Funamoto et al. ............. | 235/380 |
| 2007/0079135 | A1 * | 4/2007 | Saito ............................. | 713/183 |
| 2007/0233729 | A1 * | 10/2007 | Inoue et al. ............... | 707/103 Y |
| 2008/0098464 | A1 * | 4/2008 | Mizrah .............................. | 726/5 |
| 2008/0195536 | A1 * | 8/2008 | Karns et al. ..................... | 705/39 |

(Continued)

FOREIGN PATENT DOCUMENTS

| | | |
|---|---|---|
| JP | 2002-163584 | 6/2002 |
| JP | 2003-325919 | 11/2003 |

(Continued)

*Primary Examiner* — Ashford S Hayles
(74) *Attorney, Agent, or Firm* — Clark & Brody

(57) ABSTRACT

An authentication system is provided that authenticates a member using the member's mobile terminal. The authentication system includes a mobile terminal, a shop computer, and a head office server. The head office server includes an authentication unit. The authentication unit compares member identification information read by the shop computer with member identification information stored in a member database. Additionally, the authentication unit compares a one-time password (OTP) password with the OTP of the mobile terminal generated by the server-side OTP generation unit and received from the shop computer. The authentication unit authenticates a member based on the results of the comparison. That is, the authentication unit authenticates a member as a valid member if the former member identification information and OTP match the latter member identification information and OTP.

5 Claims, 4 Drawing Sheets

(56) References Cited

U.S. PATENT DOCUMENTS

| | | | |
|---|---|---|---|
| 2008/0222048 A1* | 9/2008 | Higgins et al. | 705/67 |
| 2009/0022314 A1* | 1/2009 | Wada et al. | 380/246 |
| 2009/0043681 A1* | 2/2009 | Shoji et al. | 705/35 |
| 2009/0172402 A1* | 7/2009 | Tran | 713/170 |
| 2009/0217076 A1* | 8/2009 | Okuhara et al. | 713/600 |
| 2009/0222459 A1* | 9/2009 | Steinberg | 707/10 |
| 2009/0249077 A1* | 10/2009 | Gargaro et al. | 713/183 |
| 2009/0254479 A1* | 10/2009 | Pharris | 705/42 |
| 2010/0088754 A1* | 4/2010 | Ghislanzoni | 726/9 |
| 2010/0191972 A1* | 7/2010 | Kiliccote | 713/172 |
| 2010/0242104 A1* | 9/2010 | Wankmueller et al. | 726/9 |
| 2010/0275010 A1* | 10/2010 | Ghirardi | 713/155 |
| 2011/0026716 A1* | 2/2011 | Tang et al. | 380/284 |
| 2011/0061097 A1* | 3/2011 | Gregg et al. | 726/7 |
| 2011/0078031 A1* | 3/2011 | Mardikar et al. | 705/17 |
| 2011/0113237 A1* | 5/2011 | Hird et al. | 713/155 |
| 2011/0113245 A1* | 5/2011 | Varadarajan | 713/168 |
| 2011/0162054 A1* | 6/2011 | Saxena et al. | 726/6 |
| 2011/0246284 A1* | 10/2011 | Chaikin et al. | 705/14.38 |
| 2011/0276495 A1* | 11/2011 | Varadarajan et al. | 705/71 |
| 2012/0067944 A1* | 3/2012 | Ross | 235/375 |
| 2012/0185398 A1* | 7/2012 | Weis et al. | 705/75 |
| 2012/0191611 A1* | 7/2012 | Kelly et al. | 705/64 |
| 2012/0240204 A1* | 9/2012 | Bhatnagar et al. | 726/5 |
| 2012/0245985 A1* | 9/2012 | Cho et al. | 705/14.23 |
| 2012/0284194 A1* | 11/2012 | Liu et al. | 705/66 |
| 2012/0290449 A1* | 11/2012 | Mullen et al. | 705/27.2 |
| 2013/0197997 A1* | 8/2013 | Ross | 705/14.49 |

FOREIGN PATENT DOCUMENTS

| | | |
|---|---|---|
| JP | 2006-072707 | 3/2006 |
| JP | 2007-047957 | 2/2007 |
| JP | 2010-191679 | 9/2010 |

* cited by examiner

AUTHENTICATION SYSTEM

CROSS REFERENCE TO RELATED APPLICATIONS

This application is based on and claims the benefit of priority from earlier Japanese Patent Application Nos. 2011-130978 filed on Jun. 13, 2011 and 2012-80441 filed on Mar. 30, 2012, the description of which is incorporated herein by reference.

BACKGROUND OF THE INVENTION

1. Field of the Invention

The present invention relates generally to an authentication system that authenticates members via the members' mobile terminals and, more particularly, to an authentication system with enhanced security.

2. Description of the Related Art

In a commodity sales system, each customer is registered as a member, and a point is accumulated when the member purchases a commodity and conveniently used to purchase a commodity in the future. In this point accumulation-type commodity sales system, there are cases in which whether a member is a valid member or not is authenticated when the member purchases a commodity at a shop.

Japanese Unexamined Patent Application Publication No. 2007-47957 discloses an authentication system that authenticates members using their mobile terminals. In this system, a mobile terminal reads member identification information indicated on a member card, such as a point card, in the form of barcode and sends the read member identification information to a server, and then the server authenticates whether a member is a valid member or not based on the barcode information received from the mobile terminal.

Japanese Unexamined Patent Application Publication No. 2006-72707 discloses a system that performs authentication using a one-time password (OTP) generated based on member identification information such as the ID number of a member. This authentication system determines whether a member is a valid member or not by indicating member identification information and an OTP generated based on the member identification information on a paper medium in the form of predetermined marks, and reading and interpreting the two marks indicated on the paper medium. Since this system uses both member identification information and an OTP, security is enhanced.

Meanwhile, the authentication system disclosed in Japanese Unexamined Patent Application Publication No. 2007-47957 is problematic in that member identification information may be fraudulently used when a member card is lost, and security is not sufficient. Furthermore, the system disclosed in Japanese Unexamined Patent Application Publication No. 2006-72707 is problematic in that member identification information and an OTP are printed on a paper medium and then used for authentication, so that a paper medium is required and also authentication cannot be performed using a mobile terminal.

SUMMARY OF THE INVENTION

Accordingly, the present invention has been made keeping in mind the above problems occurring in the prior art, and an object of the present invention is to provide an authentication system that can authenticate members using their mobile terminals and also enables authentication with enhanced security.

In order to accomplish the above object, the present invention provides an authentication system, including a mobile terminal configured to include a terminal-side OTP generation unit that generates an one-time password (OTP) based on member identification information, and to display the member identification information and the generated OTP in barcode form; a shop computer configured to read the member identification information and the OTP that are displayed by the mobile terminal in barcode form; a head office server configured to include a member database configured such that data about each member and member identification information have been stored in association with each other, a server-side OTP generation unit configured to generate an OTP based on the member identification information and an authentication unit configured to authenticate the member, and connected to the shop computer and a Point of Sale (POS) system; wherein the authentication unit compares the member identification information read by the shop computer with the member identification information stored in the member database, compares the OTP generated by the server-side OTP generation unit with the OTP of the mobile terminal received from the shop computer, and authenticates the member as a valid member if the former member identification information and OTP match the latter member identification information and OTP.

The authentication unit may set a period of validity within a predetermined range for the OTP generated by the server-side OTP generation unit, and then compare the OTP generated by the server-side OTP generation unit with the OTP received from the shop computer.

The mobile terminal may convert the OTP generated by the terminal-side OTP generation unit into text information such as numerical values, and may also display the resulting text information, the server may convert the OTP generated by the server-side OTP generation unit into text information such as numerical values, and may also send the resulting text information to the shop computer, and the shop computer may display the text information received from the server.

The terminal-side OTP generation unit may generate the OTP using OTP generation software that is downloaded from the server-side OTP generation unit.

The mobile terminal may comprise a camera unit configured to read member identification information that is indicated on a member card in barcode form, and a display unit configured to display the member identification information that is read by the camera unit, in barcode form.

According to the present invention, member identification information read by the shop computer is compared with the member identification information stored in the member database and additionally an OTP generated by the server-side OTP generation unit is compared with the OTP of the mobile terminal received from the shop computer, and a member is authenticated as a valid member if the former member identification information and OTP match the latter member identification information and OTP, thereby enabling member authentication with enhanced security. Furthermore, members can be authenticated using mobile terminals.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
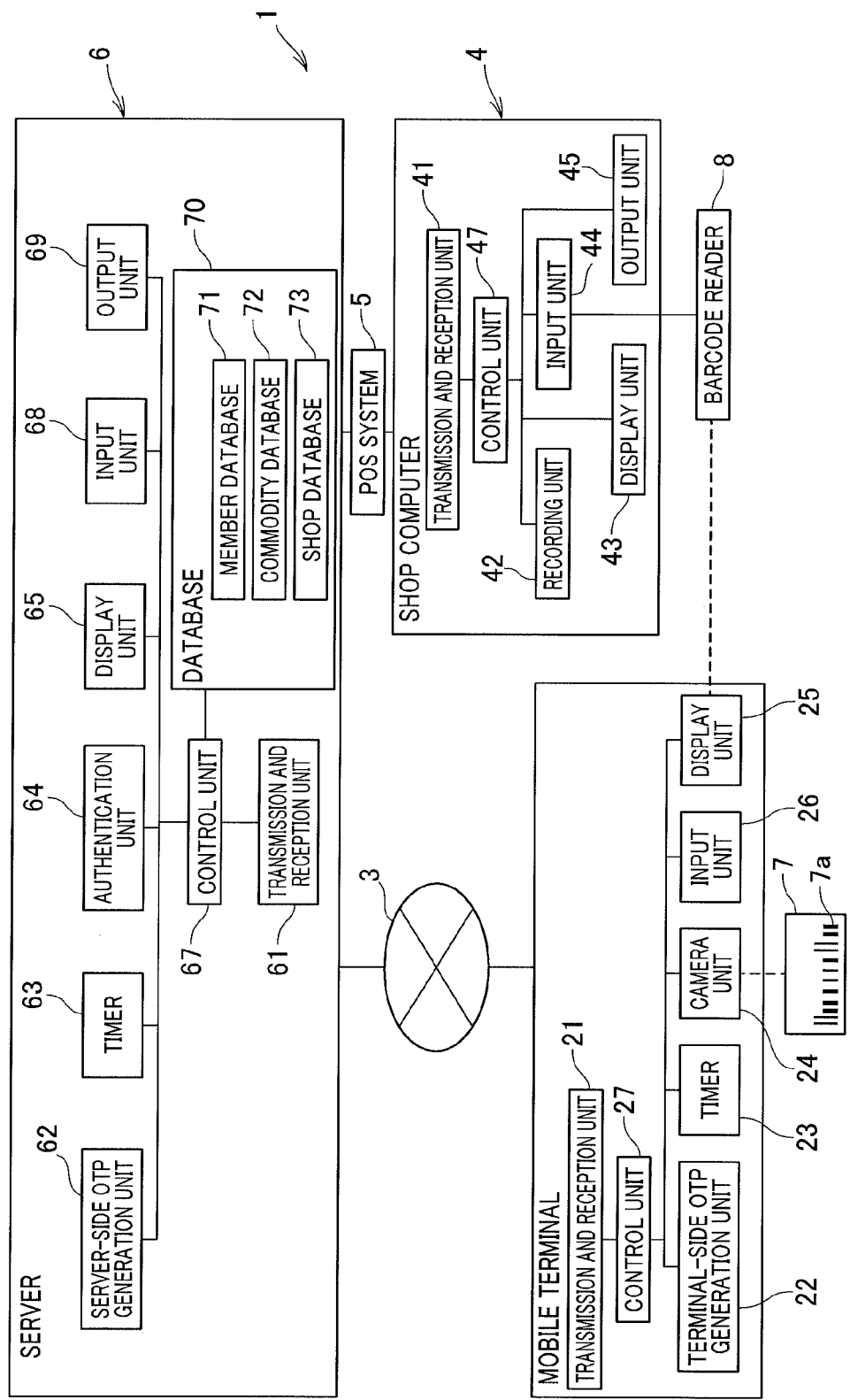
FIG. 1 is a block diagram showing the overall configuration of an authentication system according to an embodiment of the present invention.

Reference now should be made to the drawings, throughout which the same reference numerals are used throughout the different drawings to designate the same or similar components.

Figure 2:
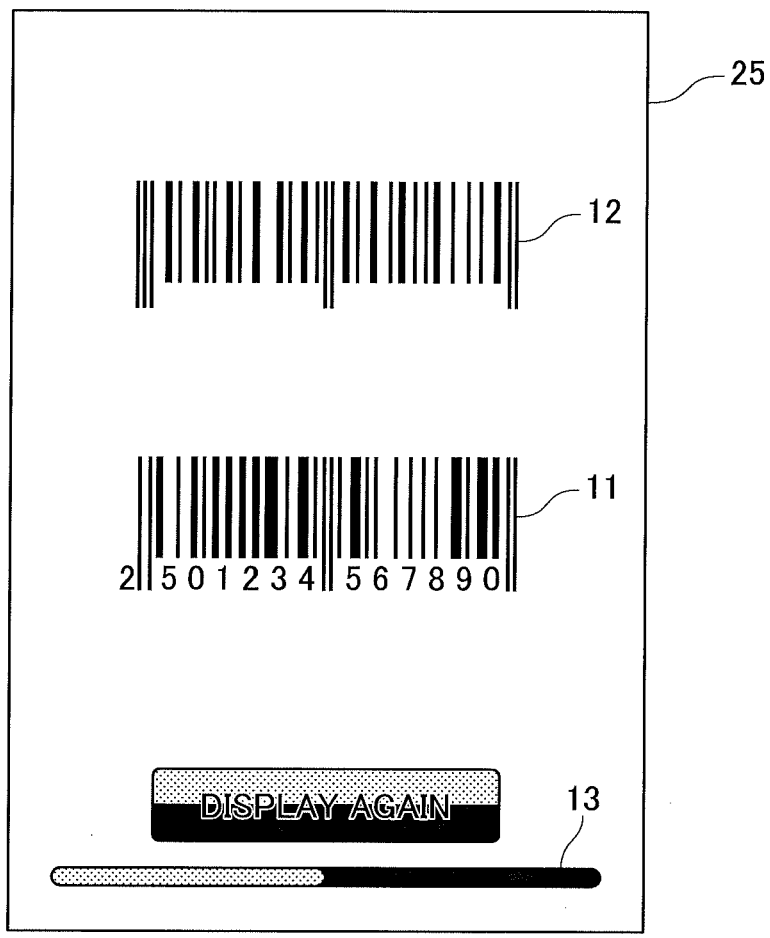
FIG. 2 is a front view showing an example of display on a mobile terminal.
Figure 3:
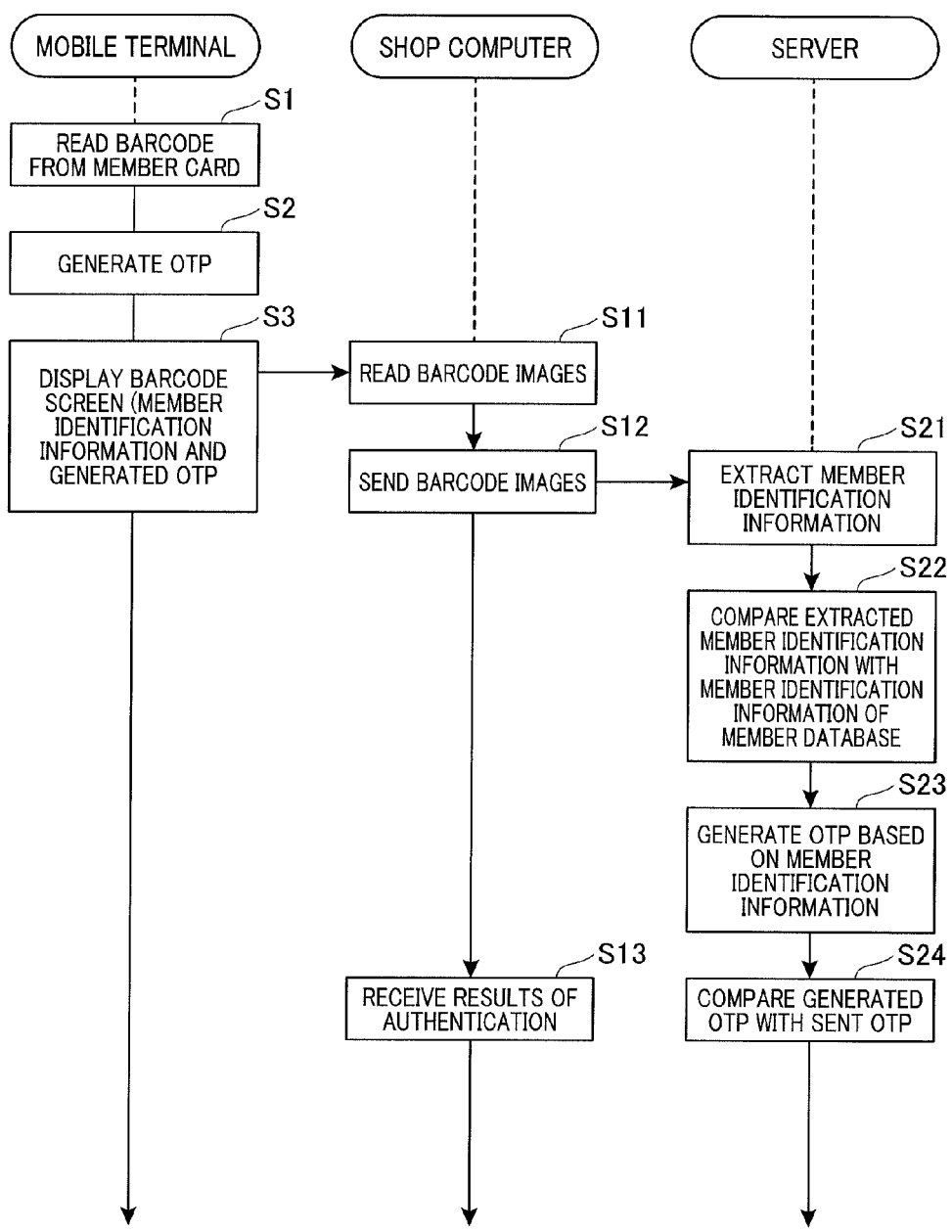
FIG. 3 is a timing chart showing the sequence of operation.

The present invention will be described in detail below in conjunction with embodiments. FIG. 1 is a block diagram showing the overall configuration of an authentication system 1 according to an embodiment of the present invention, FIG. 2 is a front view showing an example of display on a mobile terminal 2, and FIG. 3 is a timing chart showing the sequence of operation.

The authentication system 1 according to this embodiment includes a plurality of mobile terminals 2, one or more shop computers 4, and a head office server 6. The plurality of mobile terminals 2 can be connected to the head office server 6 over a network line 3 such as the Internet.

The mobile terminals 2 are communication terminals that are carried by respective members. The mobile terminals 2 may include iPhone, iPod, a smart phone (which are all registered trademarks and have been commercialized), and other mobile terminals. Each of the mobile terminals 2 includes a transmission and reception unit 21, a terminal-side OTP generation unit 22, a timer 23, a camera unit 24, a display unit 25, an input unit 26, and a control unit 27.

The transmission and reception unit 21 communicates with the head office server 6 or another mobile terminal 2 over the network line 3. The input unit 26 is a touch panel-type numeric keypad and other keys, and is used to input predetermined instructions and data when it is touched by the finger. The display unit 25 (which will be described in detail later) may be configured to also have the functionality of the input unit 26, thereby simplifying the structure of the mobile terminal 2.

The terminal-side OTP generation unit 22 generates an OTP (one-time password) based on member identification information, and includes OTP generation software (not shown). The terminal-side OTP generation unit 22 generates an OTP based on member identification information interpreted by the control unit 27 after the member identification information 7a of a member card 7 has been read by the camera unit 24. The terminal-side OTP generation unit 22 generates an OTP, that is, a random number, from the combination of the member identification information and the time at which the password is generated, using a predetermined algorithm.

The generated OTP can be used once, and is renewed whenever it is used once. Although it is preferred that the OTP generation software for generating OTPs be previously installed on the mobile terminal 2, it is much preferred that OTP generation software be downloaded from a server-side OTP generation unit 62 provided in the server 6 over the network line 3, as will be described later. Since the OTP generation software server 6 is downloaded, it is easy to generate an OTP using an algorithm that is the same as that of the server 6. The timer 23 measures time, and outputs the measured time to the terminal-side OTP generation unit 22. The terminal-side OTP generation unit 22 generates an OTP based on the input time and the member identification information.

The camera unit 24 has the same functionality as a typical camera. In this embodiment, the camera unit 24 is used to read the member identification information 7a indicated on one surface of the member card 7 in the form of barcode. The member identification information 7a indicates the member's ID number in the form of barcode. The member identification information 7a read by the camera unit 24 may be indicated on the display unit 25 in the form of barcode. Furthermore, the read member identification information is recorded in the mobile terminal 2, and therefore it can be indicated on the display unit 25 anytime. The member card 7 may be a point accumulation-type point card, a credit card, or some other type of card.

The display unit 25 is formed of a liquid crystal panel or the like, and displays predetermined data so that a user can view it. In this embodiment, the display unit 25 displays the member identification information and the OTP generated by the terminal-side OTP generation unit 22 in the form of barcode. FIG. 2 shows an example of display on the display unit 25. A barcode image 11 of the member identification information is displayed on the lower portion of a screen and a barcode image of the OTP generated by the terminal-side OTP generation unit 22 is displayed on the upper portion of the screen, so that the barcode images 11 and 12 can be displayed in parallel. For this reason, reading using the barcode reader 8 of the shop computer 4 can be performed within a short period of time. Reference numeral 13 designates a progress bar that indicates the remaining period of validity of authentication for the OTP in scale. The remaining period of validity of authentication may be determined by checking the remaining quantity of the progress bar 13.

The control unit 27 controls the overall operation of the mobile terminal 2. In this embodiment, the control unit 27 chiefly controls the terminal-side OTP generation unit 22, the camera unit 24, the display unit 25, and the input unit 26. That is, the control unit 27 controls the generation of an OTP performed by the terminal-side OTP generation unit 22, the interpretation of the member identification information 7a of the member card 7 read by the camera unit 24, the display of the barcode images 11 and 12 performed by the display unit 25, and the interpretation of commands or instructions input via the input unit 26, and other processing. Here, the control unit 27 has the function of storing member identification information. This function provides the advantage of, after reading the member identification information 7a from the member card 7, eliminating the need to read the member identification information 7a of the member card 7 again.

The shop computer 4 is installed in each shop that is selling commodities. The shop computer 4 is connected to the head office server 6 via a Point of Sale (POS) system 5, whereby the shop computer 4 and the head office server 6 are networked together. Since the connection is set up via the POS system 5, the shop computer 4 sends data member information, the date and time of a sale, shop information, and other information to the server 6. A POS computer is used as the shop computer 4.

The shop computer 4 includes a transmission and reception unit 41, a recording unit 42, a display unit 43, an input unit 44, an output unit 45, and a control unit 47. The transmission and reception unit 41 is connected to the head office server 6 via the POS system 5, and communicates with the head office server 6. The input unit 44 includes a keyboard, a scanner and/or the like, and inputs information about a commodity such as a commodity sold and sales. The output unit 45 includes a printer and/or the like, and outputs bills and other prints. The recording unit 42 records the types of commodities, the number of commodities sold, sales, and other information. The display unit 4 is formed of a liquid crystal panel or the like, and displays sales information, such as the names and prices of commodities, and other information upon selling the commodities.

The control unit 47 controls the operation of the transmission and reception unit 41, the recording unit 42, the display unit 43, the input unit 44 and the output unit 45.

The barcode reader 8 is connected to the shop computer 4. The barcode reader 8 forms part of the input unit 44, and inputs the name and price of a commodity to the input unit 44 by reading a barcode indicated on the commodity. In this embodiment, the barcode reader 8 functions to read the barcode image 11 of the member identification information and the barcode image 12 of the OTP that are displayed by the display unit 25 of the mobile terminal 2.

Once the barcode image 11 of the member identification information is read by the barcode reader 8, the information of the read barcode image 11 is sent to the control unit 47, and then interpreted by the control unit 47. Furthermore, the read member identification information is sent to the head office server 6 via the transmission and reception unit 41. In this embodiment, the barcode reader 8 does not read the member identification information 7a of the member card 7 indicated in the form of barcode, but reads the barcode image 11 of the member identification information that is displayed by the mobile terminal 2. Accordingly, upon authenticating a member (which will be described later), the member card 7 is not necessary.

Meanwhile, once the barcode image 12 of the OTP displayed by the display unit 25 of the mobile terminal 2 is read by the barcode reader 8, the read barcode image 12 of the OTP is sent to the head office server 6 and then used to authenticate the member.

The head office server 6 includes a transmission and reception unit 61, a server-side OTP generation unit 62, a timer 63, an authentication unit 64, a display unit 65, a control unit 67, an input unit 68, an output unit 69, and a database 70.

The transmission and reception unit 61 communicates with the mobile terminal 2 over the network line 3, and communicates with the shop computer 4 via the POS system 5. The input unit 68 inputs predetermined data, the output unit 69 outputs predetermined data, and the display unit 65 displays predetermined information such as the results of authentication.

The server-side OTP generation unit 62 generates an OTP based on member identification information like the terminal-side OTP generation unit 22. For this reason, the server-side OTP generation unit 62 has OTP generation software (not shown). The server-side OTP generation unit 62 and the terminal-side OTP generation unit 22 generate the same OTPs, for which reason they have common OTP generation software. Likewise, the server-side OTP generation unit 62 generates an OTP, that is, a random number, from the combination of member identification information and the time at which a password is generated, using a predetermined algorithm. The generated OTP is used once, and is renewed whenever it is used once.

The server-side OTP generation unit 62 generates an OTP based on the member identification information received from the shop computer 4. That is, the server-side OTP generation unit 62 generates the OTP in such a manner that the barcode reader 8 of the shop computer 4 reads the barcode image 11 of the member identification information displayed by the display unit 25 of the mobile terminal 2 and the server 6 receives information about the image from the shop computer 4. The timer 63 measures time, and outputs the measured time to the server-side OTP generation unit 62. The server-side OTP generation unit 62 generates the OTP based on the input time and the member identification information.

The database 70 contains at least a member database 71, a commodity database 72, and a shop database 73. The member database 71 stores the name, address and other unique information of each member, and accumulated points for the member. The member database 71 stores such information in association with member identification information that is set for each member without overlap, such as an ID number. The commodity database 72 stores information about commodities on sale, returned commodities, commodity stock, etc. The shop database 73 stores information about each shop, and the number of commodities sold and sales of the shop. The information of these databases 71, 72 and 73 is updated, and this updating is performed by the control unit 67.

The authentication unit 64 authenticates the member by comparing the member identification information received from the mobile terminal 2 and the member identification information stored in the member database 71. In this case, the barcode image 11 of the member identification information displayed by the display unit 25 of the mobile terminal 2 and read by the barcode reader 8 of the shop computer 4 is used as the member identification information of the mobile terminal 2.

In addition to authenticating the member using the member identification information, the authentication unit 64 authenticates the member by comparing the OTP generated by the server-side OTP generation unit 62 with the OTP generated by the mobile terminal 2. In this case, the barcode image 12 of the OTP displayed by the display unit 25 and then read by the barcode reader 8 of the shop computer 4 is used as the OTP generated by the mobile terminal 2. That is, the authentication unit 64 compares the OTP barcode image 12 generated by the mobile terminal 2 and then received from the shop computer 4 with the OTP generated by the server-side OTP generation unit 62. Since the OTP generated by the mobile terminal 2 and the OTP generated by the server-side OTP generation unit 62 are renewed after the passage of a predetermined time, security can be enhanced by performing the comparison of the OTPs in addition to the comparison of the pieces of member identification information.

Since the OTPs are renewed after the passage of time, the comparison of the OTPs requires that the generations of the OTPs should be synchronized with each other. The authentication unit 64 according to this embodiment compares the OTP generated by the server-side OTP generation unit 62 with the OTP generated by the mobile terminal 2. While the server-side OTP generation unit 62 generates the OTP when the member identification information (the barcode image 11 of the member identification information) sent by the shop computer 4 reaches the server 6, the OTP (the barcode image 12 of the OTP) generated by the mobile terminal 2 is read from the mobile terminal 2 by the barcode reader 8 of the shop computer 4 and then sent by the shop computer 4 to the server 6, thereby being used for comparison. Accordingly, it may be difficult to synchronize the generation of the OTP generated by the mobile terminal 2 with the OTP generated by the server 6.

In contrast, in the present embodiment, the authentication unit 64 sets a specific period of validity for the OTP generated by the server-side OTP generation unit 62. For example, a period of validity in the range from 2 to 3 minutes is set for a comparison reference time. Then if the OTPs are the same within the period of validity, it is determined that authentication is successful, with the result that authentication can be performed, even though there is a somewhat time difference between the generations of OTPs.

The control unit 67 controls the transmission and reception unit 41, the recording unit 42, the display unit 43, the input unit 44, and the output unit 45, and also performs the reading and writing of information from and to the member database 71, the commodity database 72, and the shop database 73.

Next, the sequence of authentication according to this embodiment will be described below with reference to FIG. 3.

The mobile terminal 2 communicates with the head office server 6 over the network line 3, and downloads OTP generation software stored in the server-side OTP generation unit 62 of the server 6. When the OTP generation software has been installed already, the above download is not necessary.

First, in the mobile terminal 2, the camera unit 24 reads the member identification information 7a indicated on the member card 7 in the form of barcode at step S1. The read member identification information is recorded in the mobile terminal 2 and the terminal-side OTP generation unit 22 generates the OTP based on the read member identification information of the member card 7 at step S2. Then the display unit 25 displays the OTP generated by the terminal-side OTP generation unit 22 and the member identification information read from the member card 7 as the barcode images 11 and 12 at step S3. An example of the display of the barcode images using the display unit 25 is shown in FIG. 2.

The member presents the mobile terminal 2 to a shop clerk of a shop with the display unit 25 displaying the barcode images 11 and 12. Then the shop clerk reads the barcode images 11 and 12 from the display unit 25 using the barcode reader 8 of the shop computer 4 at step S11. The shop computer 4 sends the read barcode images 11 and 12 to the head office server 6 via the network line of the POS system 5 at step S12.

Once the head office server 6 receives the barcode images 11 and 12 from the shop computer 4, the head office server 6 extracts member identification information therefrom at step S21. The control unit 67 of the server 6 outputs the extracted member identification information to the authentication unit 64. Then the authentication unit 64 of the server 6 compares the member identification information stored in the member database 71 with the member identification information received from the shop computer 4 at step S22.

If the pieces of member identification information match each other, the control unit 67 controls the server-side OTP generation unit 62, and the server-side OTP generation unit 62 generates the OTP based on the member identification information of the member database 71 at step S23. Meanwhile, If the member identification information received from the shop computer 4 does not match the member identification information of the member database 71, the server-side OTP generation unit 62 does not generate the OTP.

The authentication unit 64 of the server 6 compares the OTP generated by the server-side OTP generation unit 62 with the mobile terminal-side OTP received from the shop computer 4 at step S24. The authentication unit 64 authenticates the member as a valid member if the OTPs match each other, and authenticates the member as an invalid member if the OTPs do not match each other.

The display unit 65 of the server 6 displays the results of the authentication. Furthermore, the server 6 sends the results of the authentication to the shop computer 4 via the transmission and reception unit 61, and the shop computer 4 receives them at step S13. This enables the shop clerk of the shop to determine whether the member is a valid member or not.

In the above-described comparison, the authentication unit 64 of the server 6 sets a period of validity in a predetermined range, and the OTP of the server-side OTP generation unit 62 is compared with the mobile terminal-side OTP within the period of validity in the predetermined range. This authentication will be described below.

The server-side OTP generation unit 62 generates an OTP at predetermined time intervals (for example, 1 minute), and outputs the generated OTP to the authentication unit 64. The authentication unit 64 compares the OTP from the server-side OTP generation unit 62 with the mobile terminal-side OTP from the shop computer 4 at predetermined time intervals (for example, 1 minute).

The OTP varies over time. In this case, a period of validity (for example, 3 minutes) is set in relation to the passage of time, and the OTO after the passage of 0 minutes, the OTP after the passage of 1 minute, the OTP after the passage of 2 minutes, and the OTP after the passage of 3 minutes are compared with the terminal-side OTP. Then the authentication unit 64 authenticates a member as a valid member at that time if the terminal-side OTP matches one of the OTPs, and authenticates a member as an invalid member if the terminal-side OTP does not match any one of the OTPs. This enables authentication to be performed, even though there is a somewhat time difference between the generation of the OTP by the mobile terminal 2 and the generation of the OTP by the server 6.

In this embodiment, the member is authenticated not only by comparing the OTP generated by the mobile terminal 2 with the OTP generated by the server 6 but also by comparing the member identification information from the mobile terminal 2 with the member identification information from the member database 71 of the server 6, thereby enabling authentication with enhanced security. Furthermore, authentication can be performing using the mobile terminal 2, thereby enabling convenient authentication.

In this embodiment, the mobile terminal 2 and the server 6 are configured to convert the generated OTP and member identification information into text information such as numerical values. The configuration of this case will be described below.

The mobile terminal 2 has the function of converting the member identification information 7a read from the member card 7 and the OTP generated by the terminal-side OTP generation unit 22 into text information such as numerical values. This conversion is performed, for example, by pressing a conversion button (not shown) displayed by the mobile terminal 2, and the control of this conversion may be performed by the control unit 27. The display unit 25 of the mobile terminal 2 displays the resulting text information so that a user can view it. Furthermore, when the mobile terminal 2 has been already acquired and has already stored member identification information, the control unit 27 converts the stored member identification information into text information such as numerical values.

Figure 4:
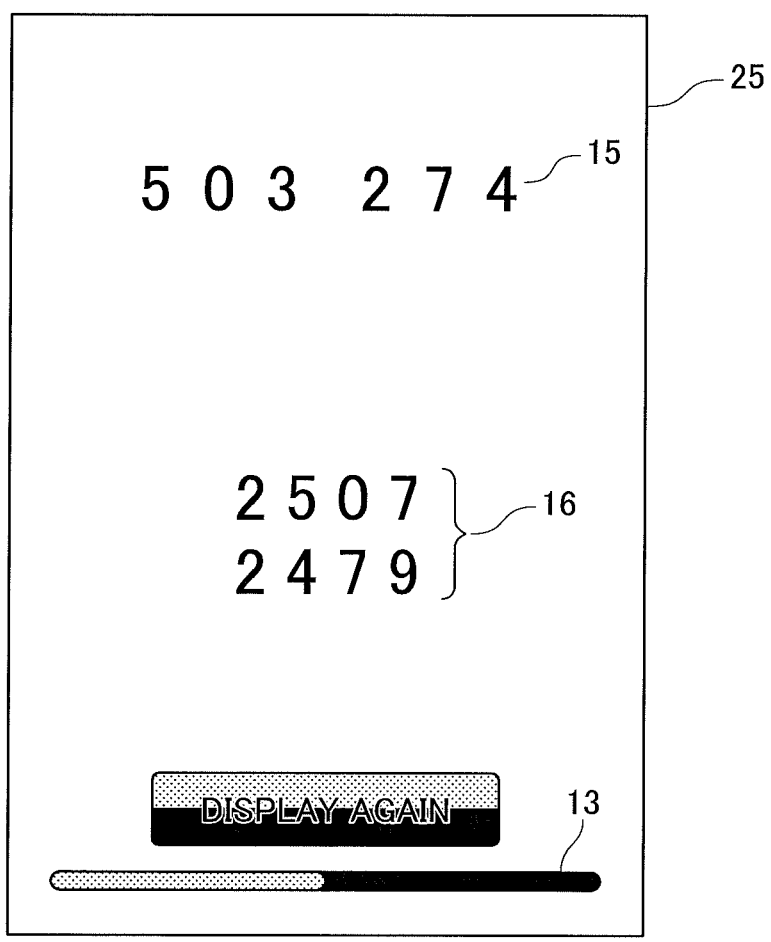
FIG. 4 is a front view showing an example of the display of text information on a mobile terminal.

FIG. 4 shows an example of display on the mobile terminal 2. The numerical values on the lower portion of a screen is the text information 16 of the member identification information and the numerical values on the upper portion of the screen is the text information of the OTP, which correspond to the barcode images that are displayed by the display unit 25 of FIG. 2. As described above, the display unit 25 of the mobile terminal 2 displays the member identification information and the OTP in the form of text information, such as numerical values, so that the member and the shop clerk of the shop can view them on the display unit 25, with the result that the member and the shop clerk of the shop can check them with the naked eye.

The server 6 has the function of converting the member identification information stored in the member database 71 and the OTP generated by the server-side OTP generation unit 62 into text information such as numerical values. This conversion may be executed by the control unit 67. In the server 6, the transmission and reception unit 61 sends the resulting text information to the shop computer 4.

The shop computer 4 displays the member identification information and the OTP composed of text information and received from the server 6 on the display unit 43 so that a user can view them. By viewing the display of the shop computer 4, the shop clerk of the shop may compare the text information of the member identification information and the text information of the OTP displayed by the mobile terminal 2 with the text information of the member identification information and the text information of the OTP received from the server 6. The shop clerk of the shop may authenticate a member as a valid member if the text information of the mobile terminal 2 matches the text information of the server 6, and authenticates the member as an invalid member if there is no match.

As described above, the mobile terminal 2 may convert member identification information and an OTP into text information and also the server 6 may convert member identification information and an OTP into text information, and therefore the text information of the server 6 can be sent to the shop computer 4, thereby helping the shop clerk of the shop perform authentication with the naked eye. Accordingly, even when the barcode reader 8 of the shop cannot read the barcode images 11 and 12 displayed by the mobile terminal 2, a member can be authenticated. This enables member authentication to be dealt with flexibly.

The present invention is not limited to the above embodiments, but a variety of medications can be made to the present invention. For example, although in the present embodiment, the server-side OTP generation unit 62 generates an OTP based on member identification information stored in the member database 71, the present invention is not limited thereto, but the server-side OTP generation unit 62 may generate an OTP based on mobile terminal-side member identification information received from the shop computer 4.

Although in the sequence of the authentication shown in FIG. 3, the server-side OTP generation unit 62 generates an OTP after the authentication unit 64 has authenticated that member identification information received from the mobile terminal 2 matches member identification information stored in the member database 71, the present invention is not limited thereto, and the server-side OTP generation unit 62 may generate an OTP at the same time that the authentication unit 64 authenticates member identification information. In this case, the authentication unit 64 performs authentication by performing the comparison of pieces of member identification information and the comparison of OTPs based on the same timing. Moreover, although the mobile terminal 2 has a camera unit 24 that reads member identification information indicated on the member card 7 in the form of barcode, the mobile terminal 2 itself may store member identification information.

What is claimed is:

1. An authentication system, comprising:
a mobile terminal, carried by a member, which comprises:
imaging means for imaging a barcode image showing member identification information presented on a member card and obtaining the member identification information from the imaged barcode image;
recording means for recording the obtained member identification information;
a terminal-side OTP generation unit that generates a barcode image of a one-time password (OTP) based on the recorded member identification information;
displaying means for displaying, on a screen of the display, both the barcode image of the member identification information imaged by the imaging means and the barcode image of the OTP generated by the terminal-side OTP generation unit,
a head office server placed in an head office, and a point of sale (POS) system provided with a shop computer placed in a shop, both the POS system and the shop computer being networked such the shop computer is able to communicate with the head office server, wherein the shop computer comprises a reader which reads both the barcode image of the member identification information and the barcode image of the OTP that are displayed by the displaying means of the mobile terminal and a transmitter which transmits information of both the read barcode images to the POS system, wherein the head office server is in communication with both the mobile terminal via the network and the shop computer via the POS system; and
the head office server comprises:
a member database in which data showing correspondence between each member and member identification information corresponding to each member are stored in advance;
a receiver receiving the information of both the read barcode images via the POS system;
a server-side OTP generation unit generating an OTP based on the member identification information stored in the member database when the receiver receives the information of the barcode images by the receiver;
an authentication unit reading information of the barcode images transmitted from the shop computer through the POS system, first comparing the member identification information read at the shop computer with the member identification information stored in the member database, second comparing, within a period of validity which is previously set, the OTP generated by the server-side OTP generation unit with the OTP from the mobile terminal received from the shop computer via the POS system, and;
authenticating the member as a valid member when the compared results by the first and second comparisons show that the member identification information read at the shop computer matches the member identification information stored in the member database and the OTP generated at the server matches the OTP received from the shop computer; and
returning the compared results to the shop computer via the POS system, wherein the terminal-side OTP generation unit applies OTP generation software to the recorded member identification information to generate the OTP, the OTP generation software being used by the server-side OTP generation unit and being downloaded from the server via the network.

2. The authentication system of claim 1, wherein:
the mobile terminal converts both the member identification information and the OTP generated by the terminal-side OTP generation unit into text information, including numerical values, and displays on the screen of the display of the mobile terminal, as the text information, both the member identification information and the OTP which are converted by the mobile terminal;

the server converts the member identification information stored in the database and the OTP generated by the server-side OTP generation unit into text information, including numerical values, and also sends the resulting text information to the shop computer via the OTP system; and the shop computer has a display for displaying on a screen of the display of the shop computer, as the text information, both the member identification information and the OTP which are received from the server such that the text information displayed by the display of the shop computer is visually compared with the text information displayed by the display of the mobile terminal.

3. The authentication system of claim 2, wherein the mobile terminal comprises, as the imaging means, a camera unit for reading member identification information that is indicated on a member card in barcode form, and, as the display, a display unit for displaying the member identification information that is read by the camera unit, in barcode form.

4. The authentication system of claim 1, wherein the authentication unit repeatedly performs the second comparison at predetermined time intervals, each interval being shorter than the period of validity.

5. An authentication method of authenticating a member in a network system comprising:

a mobile terminal carried by the member and comprising:
imaging means for imaging a barcode image showing member identification information presented on a member card and obtaining the member identification information from the imaged barcode image,
recording means for recording the obtained member identification information,
a terminal-side OTP generation unit that generates a barcode image of an one-time password (OTP) based on the recorded member identification information,
a display, and displaying means for displaying, on a screen of the display, both the barcode image of the member identification information imaged by the imaging means and the barcode image of the OTP generated by the terminal-side OTP generation unit;

a head office server placed in an head office; and a Point of Sale (POS) system provided with a shop computer placed in a shop, both the POS system and the shop computer being networked such the shop computer is able to communicate with the head office server, wherein the ship computer comprises a reader which reads both the barcode image of the member identification information and the barcode image of the OTP that are displayed by the displaying means of the mobile terminal and a transmitter which transmits information of both the read barcode images to the POS system, wherein the head office server is in communication with both the mobile terminal via the network and the shop computer via the POS system, and the head office server comprises:

a member database in which data showing correspondence between each member and member identification information corresponding to each member are stored in advance;

a receiver receiving the information of both the read barcode images via the POS system;

a server-side OTP generation unit generating an OTP based on the member identification information stored in the member database when the receiver receives the information of the barcode images by the receiver; and an authentication unit reading information of the barcode images transmitted from the shop computer through the POS system, the method comprising steps of:

enabling the mobile terminal to download OTP generation software from the server via the network, the downloaded OTP generation software being stored in the terminal-side OTP generation unit, enabling the terminal-side OTP generation unit to apply the OTP generation software to the recorded member identification information to generate the OTP, first comparing the member identification information read at the shop computer with the member identification information stored in the member database, second comparing, within a period of validity which is previously set, the OTP generated by the server-side OTP generation unit with the OTP from the mobile terminal received from the shop computer via the POS system; and authenticating the member as a valid member when the compared results by the first and second comparisons show that the member identification information read at the shop computer matches the member identification information stored in the member database and the OTP generated at the server matches the OTP received from the shop computer; and returning the compared results to the shop computer via the POS system.

* * * * *